United States Patent
Patel

(10) Patent No.: US 10,666,071 B2
(45) Date of Patent: May 26, 2020

(54) INERTIAL USER INTERFACE PORTABLE POWER BANK AND METHOD OF OPERATION

(71) Applicant: Xentris Wireless LLC, Addison, IL (US)

(72) Inventor: Vivek Patel, Elk Grove Village, IL (US)

(73) Assignee: Xentris Wireless, LLC, Addison, IL (US)

( * ) Notice: Subject to any disclaimer, the term of this patent is extended or adjusted under 35 U.S.C. 154(b) by 72 days.

(21) Appl. No.: 16/026,624

(22) Filed: Jul. 3, 2018

(65) Prior Publication Data
US 2020/0014223 A1  Jan. 9, 2020

(51) Int. Cl.
*H02J 7/00* (2006.01)
*H01M 10/48* (2006.01)
*H01M 10/44* (2006.01)

(52) U.S. Cl.
CPC ......... *H02J 7/0029* (2013.01); *H01M 10/443* (2013.01); *H01M 10/486* (2013.01); *H01M 10/488* (2013.01); *H02J 7/0047* (2013.01); *H02J 7/0068* (2013.01); *H01M 2220/30* (2013.01)

(58) Field of Classification Search
CPC ...... H02J 7/0029; H02J 7/0047; H02J 7/0068; H01M 10/443; H01M 10/486; H01M 10/488
USPC ....................................... 320/134; 340/636.1
See application file for complete search history.

(56) References Cited

U.S. PATENT DOCUMENTS

| | | | |
|---|---|---|---|
| 6,507,172 B2 | 1/2003 | Sherman | |
| 8,058,840 B2 | 11/2011 | Daniel et al. | |
| 2002/0079866 A1 | 6/2002 | Odaohhara | |
| 2003/0189498 A1* | 10/2003 | Kakihara | G07B 15/02 340/928 |
| 2006/0187072 A1* | 8/2006 | Bruce | H01M 10/425 340/636.1 |
| 2007/0213385 A1 | 9/2007 | Kazimierczuk et al. | |
| 2013/0200841 A1 | 8/2013 | Farkas et al. | |
| 2013/0307464 A1 | 11/2013 | Zhu | |
| 2014/0308995 A1 | 10/2014 | Wu | |

FOREIGN PATENT DOCUMENTS

JP   2007-006628   1/2007
KR   10-1501031    3/2015

OTHER PUBLICATIONS

Kang, Sung Chul; International Search Report and Written Opinion for PCT/US2019/040239, dated Oct. 25, 2019, Korean Intellectual Property Office, Daejeon, Republic of Korea.

* cited by examiner

*Primary Examiner* — Zixuan Zhou
(74) *Attorney, Agent, or Firm* — Babcock IP, PLLC

(57) ABSTRACT

A portable power bank controllable via inertial input. Control includes: while in one or both of a charge mode and a providing charge mode, monitoring for an inertial input; upon detection of a first active mode inertial input, activating the user visual display; upon detection of a second active mode inertial input disabling one or both of the output mode and the charge mode; and upon detection of a third active mode inertial input, re-enabling one or both of the charge mode and the providing charge mode.

16 Claims, 4 Drawing Sheets

INERTIAL USER INTERFACE PORTABLE POWER BANK AND METHOD OF OPERATION

BACKGROUND

Field of the Invention

This invention relates to portable power banks. More particularly, the invention relates to a portable power bank with user operable thermal protection controllable via a user interface utilizing inertial input without discrete mechanical switchgear.

Description of Related Art

Portable power banks enable extended remote operation of mobile devices such as cellular phones, tablets, laptops, notebooks and their accessories. A portable power bank typically includes a rechargeable battery (single cell or multiple cells) which can be charged via external adapter as well as provide charge to connected mobile devices. Instead of being device specific, portable power banks are easily configured for use with any voltage compatible desired device merely by selecting an appropriate interconnection cable.

In order to provide users cost-efficient increased charge capacity with minimum volume, portable power banks typically balance size and cost considerations. One issue that arises as portable power banks increase capacity while minimizing size is increased chance for explosive failure due to overheating during charging and/or providing charge modes.

Portable power banks may be provided with basic interconnections for charge of the power bank and charging from the power bank. Portable power banks have also been provided with user interfaces that can provide user feedback to indicate charge level of the power bank. Mechanical switchgear of the portable power bank may be utilized to activate the user interface for a predetermined period. However, mechanical switchgear introduces additional design considerations such as overall expense and increased environmental sealing requirements. It is also known to utilize inertial input, such as shaking, to activate a remaining charge user interface indicia.

Portable power banks may include thermal protection hardwired into the portal power bank circuitry to disable charging and/or providing charge modes when the portable power bank is over a critical thermal threshold.

Therefore, an object of the invention is to provide portable power bank solutions that overcome deficiencies in the prior art.

BRIEF DESCRIPTION OF THE DRAWINGS

The accompanying drawings, which are incorporated in and constitute a part of this specification, illustrate embodiments of the invention, where like reference numbers in the drawing figures refer to the same feature or element and may not be described in detail for every drawing figure in which they appear and, together with a general description of the invention given above, and the detailed description of the embodiments given below, serve to explain the principles of the invention.

DETAILED DESCRIPTION

Although thermal overload protection may be hardwired into the portable power bank, the inventor has recognized that the thermal level sufficient to damage the portable power bank is typically far higher than a user may be comfortable, for example, holding in a hand or transporting in a pocket, causing consumer concern and/or distrust of the portable power bank. Alternatively, a portable power bank with a thermal overload protection that is set at too low a thermal level may unnecessarily limit the users use of the portable power bank when it is not in fact close to a temperature that could damage or which indicates imminent damage to the portable power bank. Thus, the inventor has devised a portable power bank with user empowered ease-of-use functionality that is cost-efficient and which does not adversely impact environmental sealing of the device.

Figure 1:
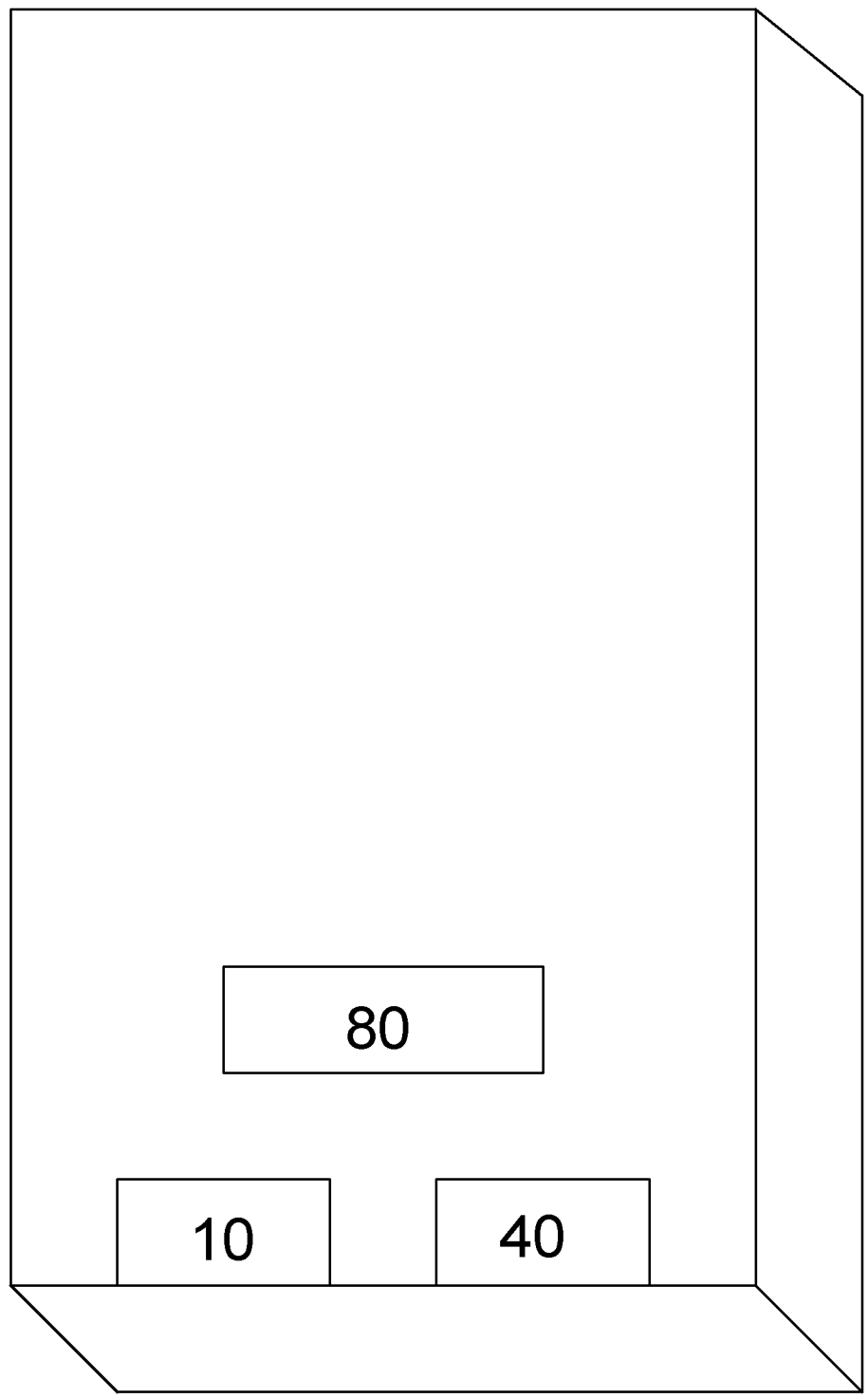
FIG. 1 is an exterior isometric view of an exemplary portable power bank utilizing inertial input.
Figure 2:
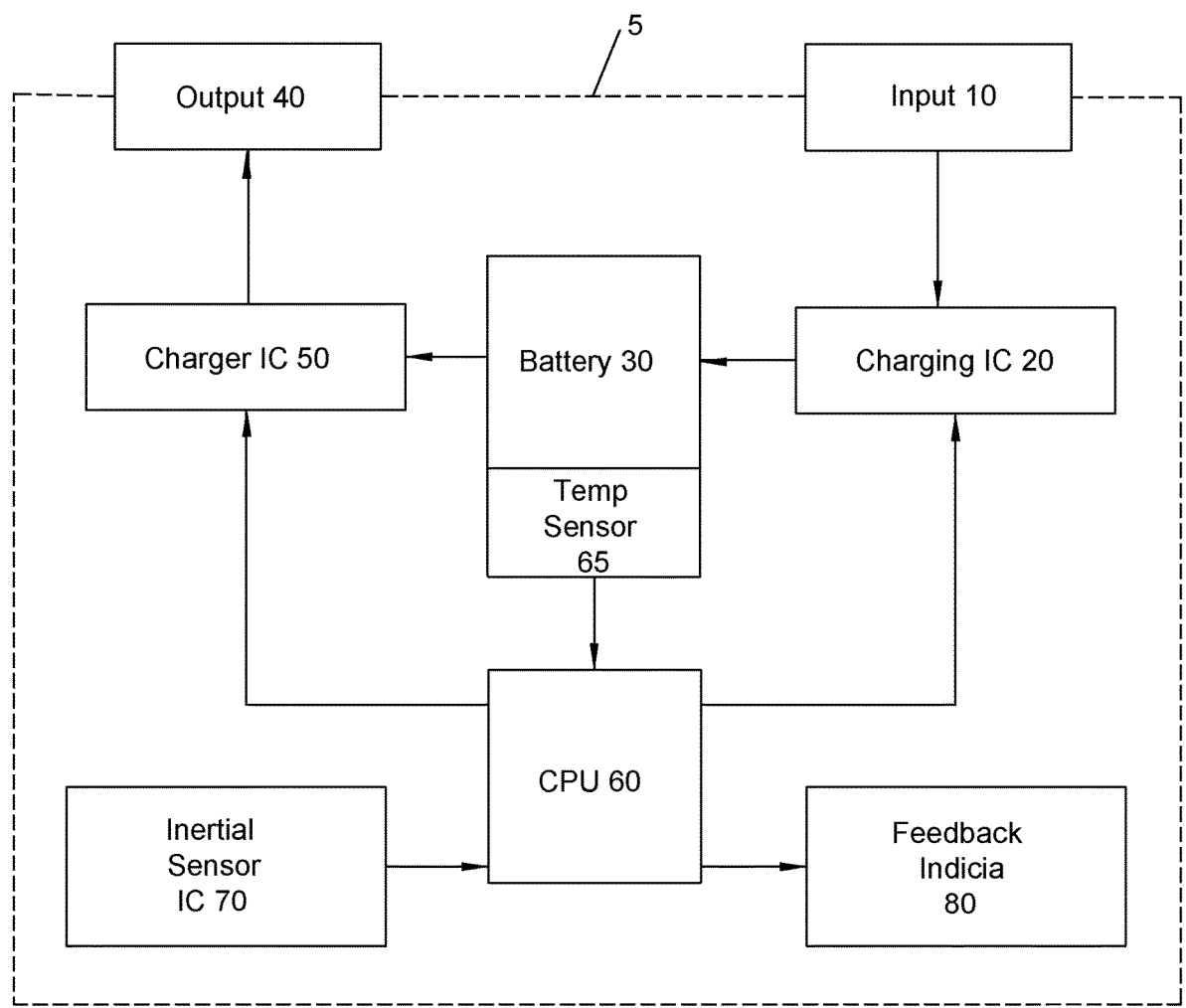
FIG. 2 is a schematic block diagram of the primary circuit components of the portable power bank of FIG. 1.

A portable power bank 5 with user feedback indicia 80 and mode of operation controllable via inertial input is shown in FIG. 1. As shown in FIG. 2, an input port 10 provides an electrical pathway through a battery charging integrated circuit (IC) 20 to a battery 30. In addition to charge control, the charging IC 20 may further include failsafe thermal shutdown circuitry. The battery 30 may be a single battery cell or an array of battery cells. The battery 30 is similarly coupled to an output port 40 via a charger IC 50. The input port 10 and output port 40 may be provided as standardized connector interfaces such as USB, micro-USB and/or USB-C.

The battery charging IC 20 and charger IC 50 are under the control of a microcontroller unit (MCU) 60. A temperature sensor 65 within the battery 30 or proximate thereto is coupled to the MCU 60. The MCU 60 receives input from an inertial sensor IC 70 and also drives state of charge and thermal level feedback indicia 80 that is configured to be observable by the user.

The inertial sensor IC 70 may include six degrees of freedom gyroscope and/or accelerometer circuitry to generate an interrupt signal for the MCU 60 upon application of an inertial input thereto. The interrupt signal (HIGH if it is active low and LOW if it is active high) may be either an open drain or push pull type. This interrupt signal from the inertial sensor IC 70 may be connected, for example, to a General Purpose Input Output (GPIO) of the MCU. The inertial input may be a shaking, tapping and/or tilt of the portable power bank within which the inertial sensor IC 70 is mounted. The inertial sensor IC 70 may be configured to set a minimum level of shake, tap and/or tilt required before the interrupt signal is generated for the MCU 60. A sufficient inertial input to trigger an interrupt signal at the MCU 60 will hereafter be referred to as a tap event. To minimize the chance for spurious inputs, a tap event threshold consisting of, for example, two detected taps of sufficient magnitude within a preselected time interval may be applied.

One skilled the art will appreciate that the inertial sensor IC 70 may be entirely encapsulated within the portable power bank, removing the need for any exterior mechanical switchgear on the portable power bank. Thereby the mechanical integrity and/or environmental sealing of the portable power bank may be improved.

Figure 3:
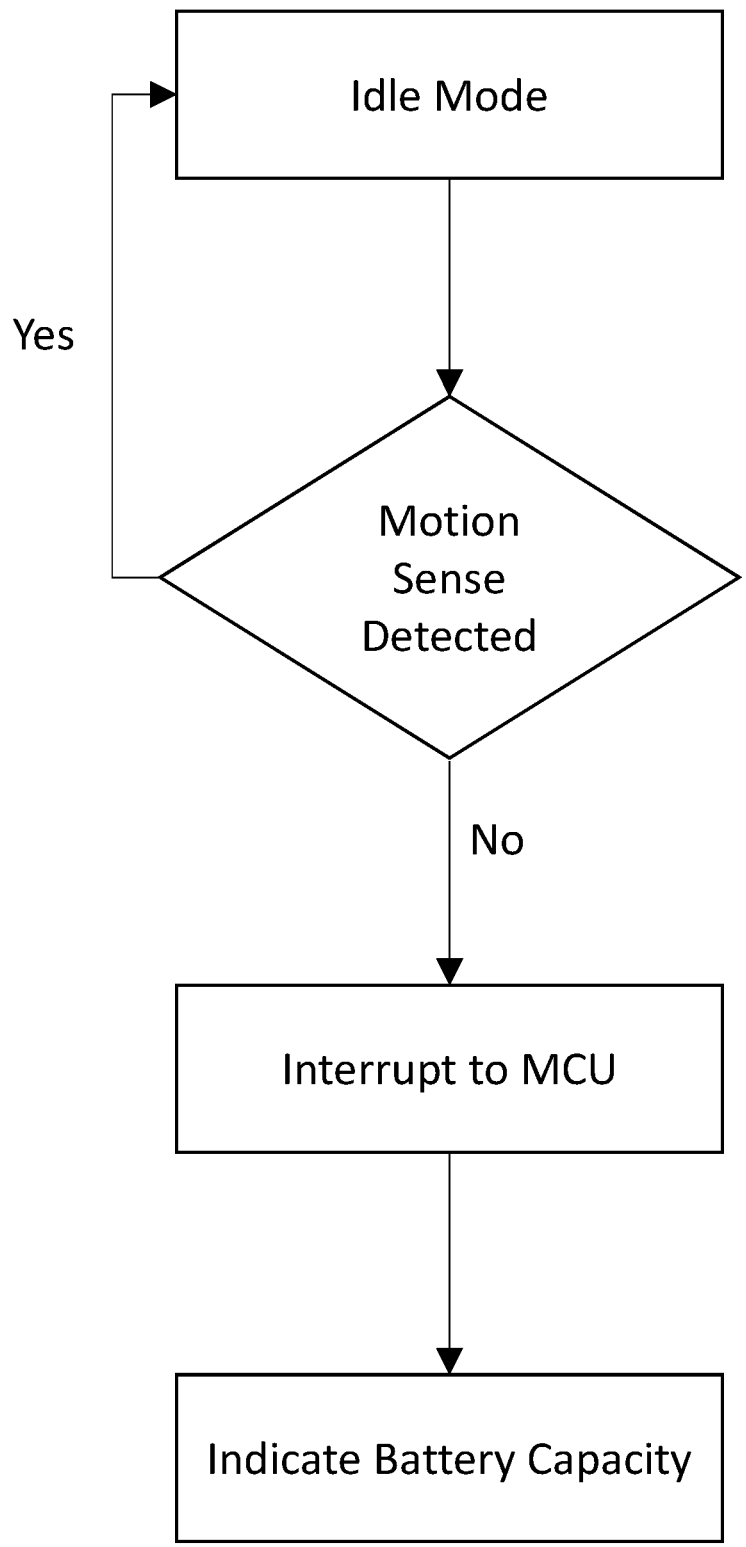
FIG. 3 is a schematic operation chart for a portable power bank in idle mode.

As shown for example in FIG. 3, in idle mode (no charge input and no output charging), when a tap event is detected by the inertial sensor IC 70, an interrupt signal is sent to the MCU 60 and the MCU 60 will turn ON the feedback indica 80 to indicate remaining battery capacity. Battery capacity indication may be, for example, either a proportional plurality of light emitting diode (LED) or liquid crystal display (LCD) indication or an alphanumeric digital percentage indication.

Figure 4:
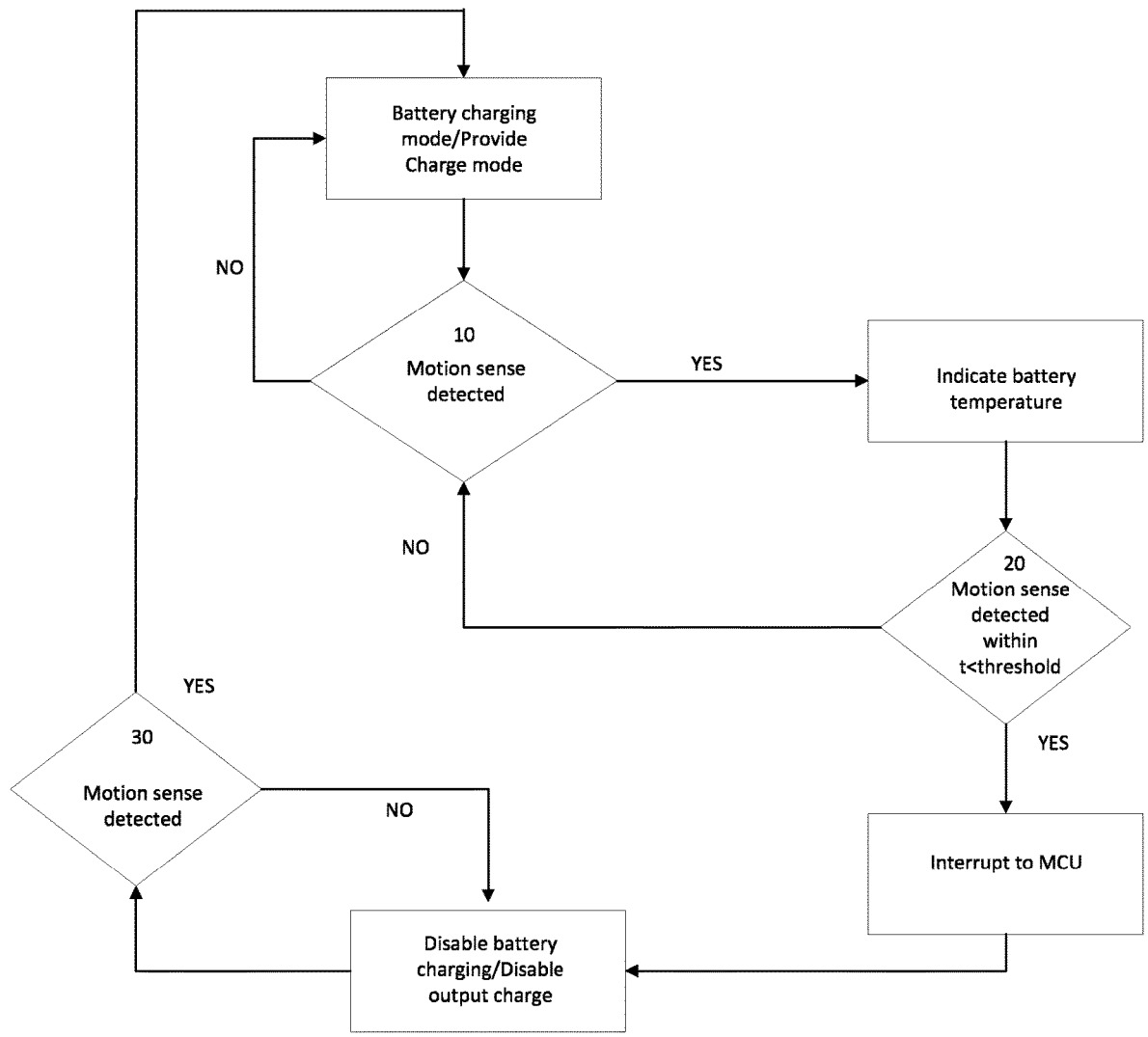
FIG. 4 is a schematic operation chart for portable power bank in charge mode and/or providing charge mode.

The MCU 60 senses the connection of a charge source to the input 10 and/or a device to be charged connection to the output 20 the occurrence of either of which sets the portable power bank 5 into a charging mode and/or a providing charge mode. As shown for example in FIG. 4, in charging mode and/or providing charge modes, when an initial tap event 10 is detected by the inertial sensor IC 70, an interrupt signal is sent by the inertial sensor IC 70 to the MCU 60. The MCU 60 will then activate the feedback indicia 80 to display the temperature of the battery 30. If the user deems the battery 30 is getting overheated or if the temperature rise is causing any discomfort in touching the power bank 5 the user can double tap on any area of the power bank 5. If the second double tap event 20 occurs within a pre-defined timeframe, for example less than 0.25 seconds, the MCU will then disable charging of the battery and also disable the output charge provided to a connected mobile device.

Once the user decides that the battery has cooled down (by simply touching the portable power bank 5), a third double tap event 30 will resume charging of the battery (if still attached) and/or enable output charge if there is a mobile device connected to the output USB port.

One skilled in the art will appreciate that the portable power bank 5 enables user control of the portable power bank temperature, and thereby operation in general, without unnecessary complication and/or manipulation of small mechanical switches. Further the ease-of-use is provided without impacting the environmental sealing of the assembly.

Table of Parts

| | |
|---|---|
| 5 | portable power bank |
| 10 | input |
| 20 | battery charging IC |
| 30 | battery |
| 40 | output |
| 50 | charger IC |
| 60 | microcontroller |
| 65 | temperature sensor |
| 70 | inertial sensor |
| 80 | feedback indicia |

Where in the foregoing description reference has been made to materials, ratios, integers or components having known equivalents then such equivalents are herein incorporated as if individually set forth.

While the present invention has been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details, representative apparatus, methods, and illustrative examples shown and described. Accordingly, departures may be made from such details without departure from the spirit or scope of applicant's general inventive concept. Further, it is to be appreciated that improvements and/or modifications may be made thereto without departing from the scope or spirit of the present invention as defined by the following claims.

I claim:

1. A method for inertial operation of a portable power bank, comprising the steps of:
    while in an idle mode, monitoring for an idle mode inertial input;
        upon detection of the idle mode inertial input, activating a feedback indicia to indicate a remaining charge;
    while in one or both of a charging mode and a providing charge mode, monitoring for an active mode inertial input;
        upon detection of a first active mode inertial input, activating the feedback indicia to indicate a battery temperature;
        upon detection of a second active mode inertial input, within a threshold time from the detection of the first active mode inertial input, disabling one or both of the charging mode and the providing charge mode;
        upon detection of a third active mode inertial input, within a threshold time from the detection of the second active mode inertial input, re-enabling one or both of the charging mode and the providing charge mode;
    the idle mode inertial input and the first, second, and third active mode inertial inputs are one of a shake, a tap upon and a tilt of the portable power bank.

2. The method of claim 1, wherein the feedback indicia provides a visual indicia of a temperature of the portable power bank.

3. The method of claim 1, wherein the feedback indicia provides a visual indicia of a charge level of the portable power bank.

4. The method of claim 1, wherein the threshold time is less than 0.25 seconds.

5. The method of claim 1, wherein the detection is via an inertial sensor.

6. The method of claim 5, wherein detection by the inertial sensor generates an interrupt signal received at an input of a microcontroller configured for control of the charge mode and the providing charge mode.

7. The method of claim 1, wherein the user visual display remains activated for a preset time before deactivating.

8. The method of claim 1, wherein the portable power bank has no exterior mechanical switchgear.

9. A method for inertial operation of a portable power bank, comprising the steps of:
    while in one or both of a charge mode and a providing charge mode, monitoring for an active mode inertial input;
        upon detection of a first active mode inertial input, activating feedback indicia indicating a battery temperature;
        upon detection of a second active mode inertial input, within a threshold time from the detection of the first active mode inertial input, disabling one or both of the output mode and the charge mode;
        upon detection of a third active mode inertial input, within a threshold time from the detection of the second active mode inertial input, re-enabling one or both of the charge mode and the providing charge mode;
    the first, second, and third active mode inertial inputs are one of a tap upon, a shake of and a tilt of the portable power bank.

10. The method of claim 9, wherein the feedback indicia provides a visual indicia of a temperature of the portable power bank.

11. The method of claim 9, wherein the feedback indicia provides a visual indicia of a charge level of the portable power bank.

12. The method of claim 9, wherein the user visual display remains activated for a preset time before deactivating.

13. The method of claim 9, wherein the threshold time is less than 0.25 seconds.

14. The method of claim 9, wherein the detection is via an inertial sensor.

15. The method of claim 14, wherein detection by the inertial sensor generates an interrupt signal received at an input of a microcontroller configured for control of the charge mode and the providing charge mode.

16. The method of claim 9, wherein the portable power bank has no exterior mechanical switchgear.

* * * * *